UNITED STATES PATENT OFFICE.

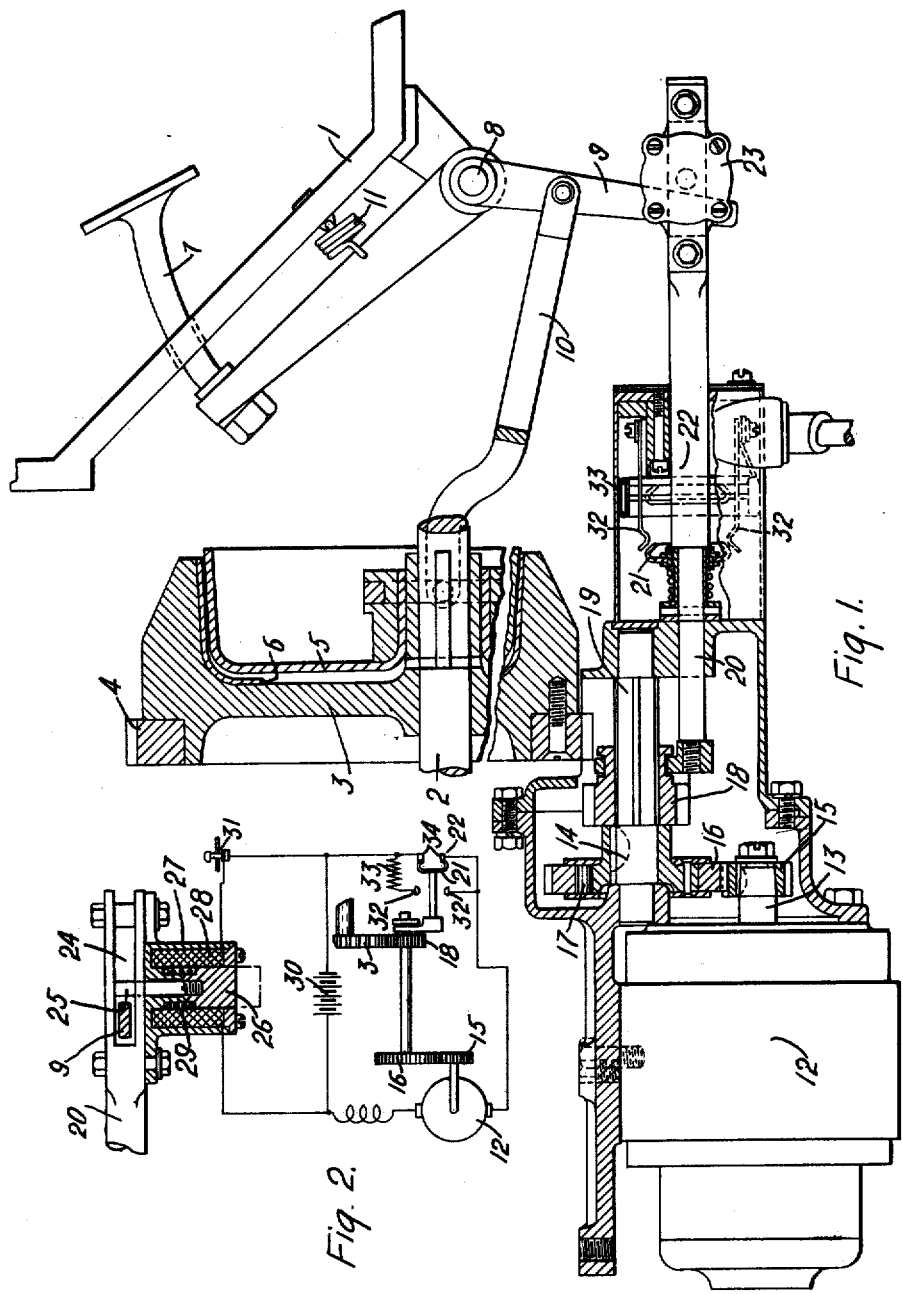

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING MECHANISM.

1,311,458.      Specification of Letters Patent.      Patented July 29, 1919.

Application filed July 24, 1914. Serial No. 852,823.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Starting Mechanism, of which the following is a specification.

My invention relates to starting mechanisms for internal combustion engines, and it has particular reference to such systems as are employed in connection with automobiles or other motor vehicles.

My invention has for one of its objects to provide a simple arrangement whereby the usual transmission clutch of a motor vehicle and the operative connection of a starting motor to the engine of such vehicle may be controlled by a single actuating member.

Another object of my invention is to provide a means whereby the accidental or inadvertent connection of the starting motor to the engine of a motor vehicle may be prevented.

In the construction of starting mechanisms for motor vehicles, it is customary to employ a separate pedal or lever for controlling the operative connection of the starting motor to the engine. In case a pedal is employed that is located on the foot board adjacent to the brake and clutch pedals, confusion is apt to result, and the starting motor may be inadvertently connected to the engine when the latter is in operation. Ordinarily, no means are provided to prevent the starting pedal from effecting the connection of the motor to the engine when the latter is in operation.

According to my present invention, I provide an arrangement whereby the usual clutch pedal is utilized to perform its normal functions and, in addition, to control the starting mechanism, when desired. Normally, the clutch pedal is disconnected from the starting mechanism but it may be connected thereto by an electromagnetic device upon the actuation of a push button conveniently placed adjacent to the driver's seat.

In the accompanying drawings, Figure 1 is a combined elevation and plan view, partially in section, of a portion of an automobile with my invention attached thereto, parts being broken away. Fig. 2 is a diagrammatic view of circuits and apparatus embodying my invention, the electromagnetic device, which is shown in section, and its related parts being enlarged.

An automobile, the foot board of which is indicated at 1, comprises an engine shaft 2 and a fly wheel 3, having gear teeth 4. Part of the fly wheel is broken away in order that its relation to coacting parts may be clearly illustrated. The usual transmission clutch of the vehicle comprises a slidable member 5 and a coacting member 6 that is formed in the fly wheel 3. The clutch member 5 is controlled by a pedal lever 7 which is connected to it by means of a rock shaft 8, an arm 9 and a link 10. A spring 11 normally retains the pedal in the position illustrated, with the clutch members in engagement.

A starting motor 12, here illustrated as an electric motor, is attached to the frame or other stationary portion of the vehicle in any suitable manner. The motor armature shaft 13 is connected to a countershaft 14 by pinions 15 and 16, the latter being connected to the countershaft 14 by means of an overrunning clutch 17 of the usual roller type. A pinion 18, which is slidably mounted upon a square portion 19 of the shaft 14, is adapted to mesh with the gear teeth 4 on the fly wheel 3. The pinion 18 is controlled by a shift rod 20 that carries the movable member 21 of a switch 22. Since the details of the switch 22, which controls the motor circuit, form no part of the present invention, it will be understood that any other suitable form of switching mechanism may be substituted.

The arm 9, which is connected to the clutch pedal lever 7, is adapted to be connected to the shift rod 20 by an electromagnetic device 23, the details of which are shown in Fig. 2. The shift rod 20 is provided with a slot 24, in which the arm 9 normally reciprocates without actuating the shift rod 20. A pin 25, which is connected to the core member 26 of an electromagnet 27, is adapted to be projected into the slot 24 in the path of movement of the arm 9 when a magnet coil 28 is energized. Normally, the core member 26 and the pin 25 are retained in their outer positions by a spring 29.

As illustrated diagrammatically in Fig. 2, energy is supplied to the motor 12 by a storage battery 30, the motor circuit being controlled by the switch 22. A push button 31, which may be located at any convenient point, as, for example, upon the dash board or the steering wheel of the vehicle, controls the circuit of the magnet coil 28.

When it is desired to start the engine of the vehicle, the push button 31 is actuated to close the circuit of the magnet coil 28 and thus cause the pin 25 to assume the position illustrated in Fig. 2. The arm 9, which normally occupies the position illustrated, is accordingly connected to the shift rod 20. The pedal 7 is then pressed forwardly to simultaneously disconnect the clutch member 5 from the clutch member 6 and to actuate the shift rod 20 and the pinion 18 backwardly. The switch member 21 first engages contact clips 32 to temporarily complete the circuit of the motor through a resistor 33. Since the contact clips 32 are engaged only momentarily, the motor armature will rotate slowly because of its inertia and thus insure that the pinion 18 will mesh readily with the gear teeth 4. When the pinion 18 is fully meshed with the gear teeth 4, the contact member 21 engages contact members 34 to complete the running circuit of the motor. When the engine starts under its own power, the operator releases the push button 31, and the spring 29 returns the pin 25 and core member 26 to the positions indicated by dotted lines in Fig. 2. The pedal 7 can then be actuated, as desired, to control the transmission clutch without affecting the connecting mechanism of the starting motor.

By employing a mechanism constructed in accordance with my invention, it is possible to avoid the use of a large number of pedals or levers which control the various accessories of an automobile. When the transmission clutch and the starting motor are interlocked in the manner described above, it is impossible to connect the starting motor to the engine when the clutch is connected so that there is no possibility of the starting motor being employed to drive the car. It is impossible, also, to inadvertently connect the starting motor to the engine by actuating the clutch pedal lever 7 because it is also necessary to previously press the button 31 in order to connect the clutch pedal lever to the starting mechanism.

I claim as my invention:

1. In a starting mechanism, the combination with an engine shaft, an electric starting motor, a circuit for said motor and means for operatively connecting said motor to said shaft, of a clutch lever normally disconnected from said connecting means, an electromagnetic device for connecting said lever to said connecting means, and a circuit for controlling said device that is independent of the circuit of said motor.

2. In a starting mechanism, the combination with an engine shaft, an electric starting motor, and means for operatively connecting said motor to said shaft, said means comprising a slidable pinion, of a clutch lever normally disconnected from said pinion, means comprising a member for connecting said lever to said pinion, an electromagnet for controlling said member, and means for causing the operation of the electromagnet but not the motor.

3. In a starting mechanism, the combination with an internal combustion engine, a clutch having one member operatively connected to said engine, and a lever for controlling the other clutch member, of an electric motor, means for operatively connecting said motor to said engine, and means comprising said lever and an electro-responsive device controlled independently of said motor for controlling said connecting means.

4. In a starting mechanism, the combination with an engine shaft, a starting motor, means for operatively connecting said motor to said shaft, and a clutch operatively related to said shaft, of means for simultaneously controlling said clutch and said connecting means, said controlling means comprising a movable member controlled independently of said motor.

5. In a starting mechanism, the combination with an engine shaft, an electric starting motor, means for operatively connecting said motor to said shaft, and a clutch operatively related to said shaft, of means comprising a lever and an electro-responsive latching mechanism for controlling said clutch and said connecting means, said controlling means being normally disconnected from said connecting means, and means for controlling said mechanism without disturbing said motor.

6. In a starting mechanism, the combination with an engine shaft, of an electric starting motor, means including a pinion for operatively connecting said motor to said shaft, a clutch lever having one member operatively connected to said engine shaft, a battery adapted to be electrically connected in circuit with said motor, a member for connecting said lever to said pinion, an electromagnet for controlling said connecting member, and means whereby said electromagnet may be electrically connected in circuit with said battery independently of said motor connection to cause the operation of the electromagnet but not the motor.

7. In a starting mechanism, the combination of an engine shaft, a starting motor, means for operatively connecting said motor to said shaft comprising a slotted rod, an electromagnet, a pin operable by said electromagnet and adapted to be projected into said slot, a clutch operatively related to said shaft, and means for controlling said clutch and said connecting means, comprising a lever projecting into said slot and normally freely movable therein but adapted to operate said rod when said pin projects into the slot.

In testimony whereof, I have hereunto subscribed my name this 20th day of July, 1914.

JOHN P. NIKONOW.

Witnesses:
B. B. HINES,
M. C. MERZ.

Copies of this patent may be obtained for five cents each, by addressing the "Commissioner of Patents, Washington, D. C."